United States Patent
Hong

(10) Patent No.: US 8,582,075 B2
(45) Date of Patent: Nov. 12, 2013

(54) METHOD FOR FABRICATING A LIQUID CRYSTAL DISPLAY DEVICE

(75) Inventor: Hyun Seok Hong, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 1199 days.

(21) Appl. No.: 11/646,240

(22) Filed: Dec. 28, 2006

(65) Prior Publication Data

US 2007/0153225 A1 Jul. 5, 2007

(30) Foreign Application Priority Data

Dec. 30, 2005 (KR) .................. 10-2005-0134995

(51) Int. Cl.
*G02F 1/1339* (2006.01)
(52) U.S. Cl.
USPC .......................................... 349/190; 153/154
(58) Field of Classification Search
USPC .......................................... 349/153, 154, 190
See application file for complete search history.

(56) References Cited

U.S. PATENT DOCUMENTS

| | | | |
|---|---|---|---|
| 6,982,777 B2* | 1/2006 | Lai et al. | 349/153 |
| 2001/0026346 A1* | 10/2001 | Nagasako | 349/153 |
| 2004/0080702 A1* | 4/2004 | Lai et al. | 349/153 |
| 2004/0114086 A1* | 6/2004 | Lee et al. | 349/153 |
| 2005/0122465 A1* | 6/2005 | Togashi | 349/190 |

FOREIGN PATENT DOCUMENTS

| | | | |
|---|---|---|---|
| JP | 01061731 A | * | 3/1989 |
| JP | 2002-98942 A | | 4/2002 |
| KR | 10-2002-0054853 A | | 7/2002 |
| KR | 10-2005-0012565 A | | 2/2005 |

* cited by examiner

*Primary Examiner* — Jessica M Merlin
(74) *Attorney, Agent, or Firm* — McKenna Long & Aldridge LLP

(57) ABSTRACT

A method for fabricating a liquid crystal display (LCD) device includes preparing a lower substrate and an upper substrate; forming a plurality of seal patterns on any one of the upper and lower substrates, each seal pattern including a main pattern and an injection port pattern, wherein a width of the injection port pattern is smaller than a width of the main pattern; bonding the upper and lower substrates to each other using the plurality of seal patterns; and cutting the bonded upper and lower substrates into a plurality of unit cells.

3 Claims, 9 Drawing Sheets

METHOD FOR FABRICATING A LIQUID CRYSTAL DISPLAY DEVICE

This application claims the benefit of the Korean Patent Application No. 10-2005-134995, filed on Dec. 30, 2005, which is hereby incorporated by reference as if fully set forth herein.

BACKGROUND OF THE INVENTION

1. Field of the Invention

The present invention relates to a liquid crystal display (LCD) device and method for fabricating the same, and more particularly, to a seal pattern included in an LCD device.

2. Discussion of the Related Art

Among flat panel display devices, liquid crystal display (LCD) devices have many advantages, such as a low energy consumption due to a low operating voltage thereof and a high applicability for portable appliances, etc. Therefore, LCD devices are widely used in a variety of fields such as monitors for notebook computers, spaceships, aircraft, etc.

Generally, an LCD device includes upper and lower substrates facing each other, a liquid crystal layer between the upper and lower substrates, and a seal material surrounding the liquid crystal layer to bond the upper and lower substrates together.

A method for fabricating an LCD device according to the related art will be explained with reference to the accompanying drawings. FIGS. 1A to 1D are schematic perspective views illustrating a method for fabricating an LCD device according to the related art.

Referring to FIG. 1A, a lower substrate 10 and an upper substrate 30 are first prepared. Although not shown, the lower substrate 10 is formed with thin-film transistors and pixel electrodes, and the upper substrate 30 is formed with a black matrix layer, a color filter layer, and a common electrode.

Referring to FIG. 1B, a seal pattern 50 is then coated on the lower substrate 10. The seal pattern 50 has an injection port to inject liquid crystal into a space between the lower substrate 10 and the upper substrate 30 after bonding the substrates 10 and 30.

Referring to FIGS. 1C and 1D, the lower substrate 10 and upper substrate 30 are bonded together using the seal pattern 50. Thereafter, the bonded lower and upper substrates 10 and 30 are cut into a plurality of unit cells, as illustrated in FIG. 1D. Each unit cell is configured in such a manner that a side x of the lower substrate 10 is longer than the corresponding side y of the upper substrate 30 to expose a pad portion formed on the lower substrate 10 for the connection of a drive circuit. In FIG. 1D, the pad portion of the lower substrate 10 is marked with oblique lines. In order to expose the pad portion of the lower substrate 10, it is necessary to perform a primary cutting process for cutting both the lower substrate 10 and upper substrate 30 along the line A-A of FIG. 1C and a secondary cutting process for cutting a portion of the upper substrate 30 along the line B-B of FIG. 1C.

Although not shown, after the cutting processes, liquid crystal is injected into the space between the lower substrate 10 and the upper substrate 30 through the injection port of the seal pattern 50 formed at each unit cell. After completing the injection of the liquid crystal, the injection port of the seal pattern 50 is sealed to complete the fabrication process of the LCD device.

The method for fabricating an LCD device according to the related art has, however, the following problems.

In order to increase productivity, it is beneficial to increase the number of unit cells to be formed on a single substrate. As the number of unit cells increases, the distance between the unit cells becomes smaller and the distance between the seal patterns formed unit cells becomes reduced. Because of the reduced distance between the seal patterns, the seal pattern in one unit cell spreads out to adjacent unit cells during the bonding process, thereby decreasing efficiency in the cutting process. This problem will be described in more detail with reference to FIGS. 2A and 2B.

Referring to FIGS. 2A and 2B, the circle "C" illustrates the seal pattern 50 spread out to a neighboring unit cell when the lower substrate 10 and upper substrate 30 are bonded to each other. As described above, after the boding process, a cutting process is performed along the line B-B of FIG. 2A to remove a portion 30a of the upper substrate 30 of the unit cell to expose the pad portions of the lower substrate 10. However, the seal pattern 50 spread out to a neighboring unit cell may cause a failure in the cutting process.

SUMMARY OF THE INVENTION

Accordingly, the present invention is directed to a liquid crystal display (LCD) device and method for fabricating the same that substantially obviates one or more problems due to limitations and disadvantages of the related art.

An advantage of the present invention is to provide a method for fabricating an LCD device that can improve the cutting process thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a liquid crystal display device includes preparing a lower substrate and an upper substrate; forming a plurality of seal patterns on any one of the upper and lower substrates, each seal pattern including a main pattern and an injection port pattern, wherein a width of the injection port pattern is smaller than a width of the main pattern; bonding the upper and lower substrates to each other using the plurality of seal patterns; and cutting the bonded upper and lower substrates into a plurality of unit cells.

In another aspect of the present invention, a method for fabricating a liquid crystal display device includes preparing a lower substrate and an upper substrate; forming an organic layer on the lower substrate; forming a plurality of seal patterns on any one of the upper and lower substrates, each seal pattern including a main pattern and an injection port pattern; bonding the upper and lower substrates to each other using the plurality of seal patterns; and cutting the bonded upper and lower substrates into a plurality of unit cells.

In another aspect of the present invention, a liquid crystal display device includes a lower substrate and an upper substrate facing each other; and a seal pattern between the lower and upper substrates, the seal pattern including a main pattern and an injection port pattern, wherein a width of the injection port pattern is smaller than a width of the main pattern.

In yet another aspect of the present invention, a liquid crystal display device a lower substrate and an upper substrate facing each other; an organic layer on the lower substrate; and seal patterns between the lower and upper substrates, each seal pattern including a main pattern and an injection port pattern, the injection port pattern on the organic layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

First Embodiment

FIGS. 3A to 3D are schematic perspective views illustrating a method for fabricating a liquid crystal display (LCD) device according to the first embodiment of the present invention.

Figure 1A:
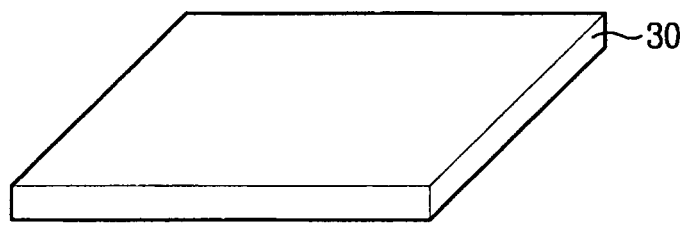
FIGS. 1A to 1D are schematic perspective views illustrating a method for fabricating an LCD device according to the related art.
Figure 1A:
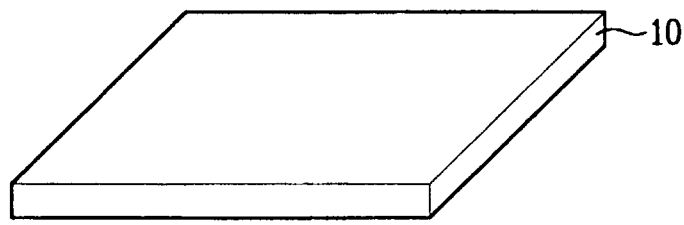
Figure 1B:
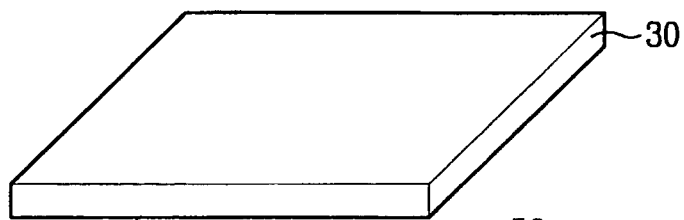
Figure 1B:
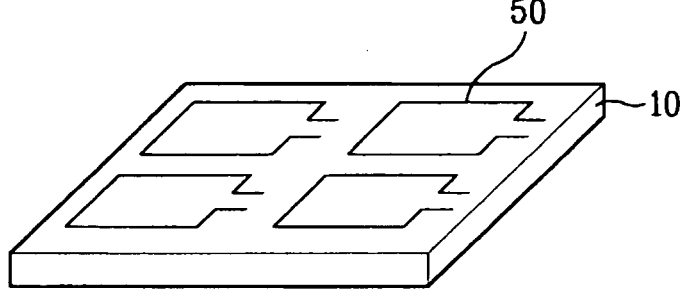
Figure 1C:
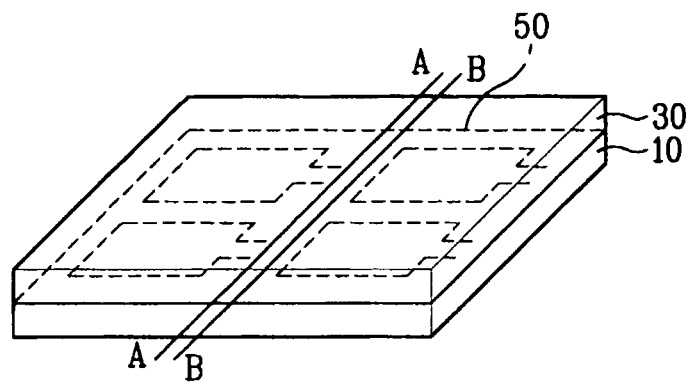
Figure 1D:
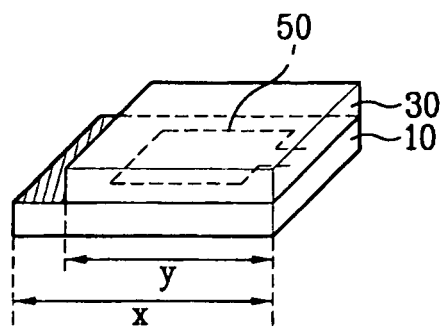
Figure 2A:
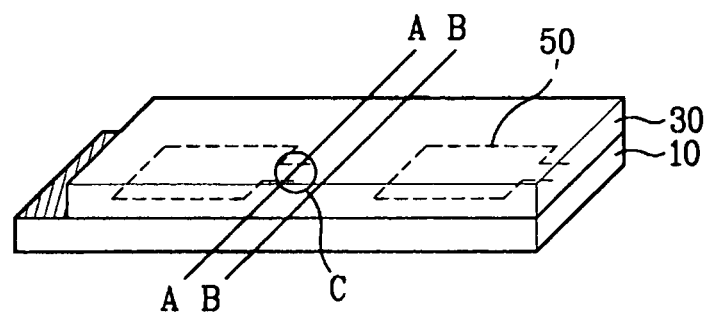
FIGS. 2A and 2B are schematic perspective views illustrating a problem of the related art method for fabricating an LCD device.
Figure 2B:
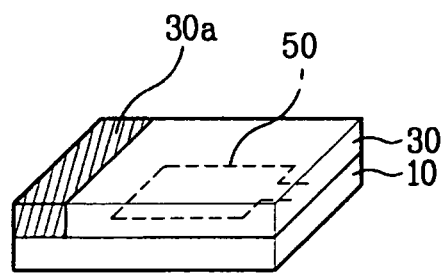
Figure 3A:
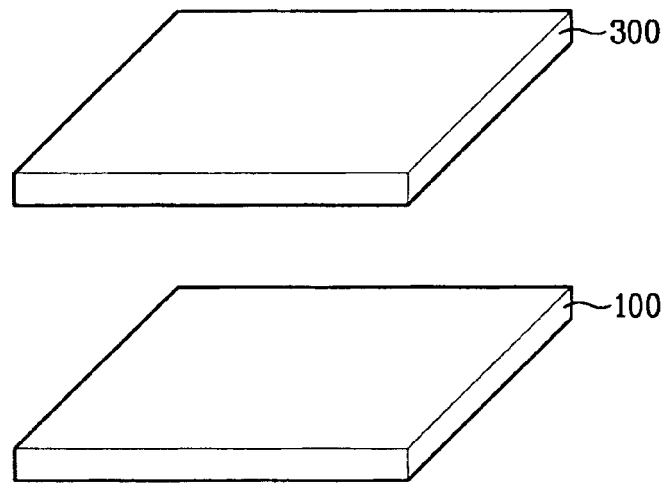
FIGS. 3A to 3D are schematic perspective views illustrating a method for fabricating an LCD device according to the first embodiment of the present invention.

Referring to FIG. 3A, a lower substrate 100 and an upper substrate 300 are first prepared depending on a driving mode of the LCD device.

For example, in the case of a twisted nematic (TN) mode, the lower substrate 100 is formed with gate lines and data lines that cross each other and define pixel regions, thin-film transistors that are formed near the crossings of the gate and data lines and serve as switching devices, and a pixel electrode in each pixel region. The upper substrate 300 is formed with a black matrix layer for preventing a light leakage, a color filter layer for realizing color images, and a common electrode for generating an electric field in association with the pixel electrode of the lower substrate 100.

In the case of an in-plane switching (IPS) mode, the lower substrate 100 is formed with gate lines and data lines that cross each other and define pixel regions, thin-film transistors that are formed near the crossings of the gate and data lines and serve as switching devices, and pixel electrodes and common electrodes that are formed in each pixel region and serve as a pair of electrodes for generating a horizontal electric field. The upper substrate 300 is formed with a light-shielding layer for preventing a light leakage and a color filter layer for realizing color images.

Figure 3B:
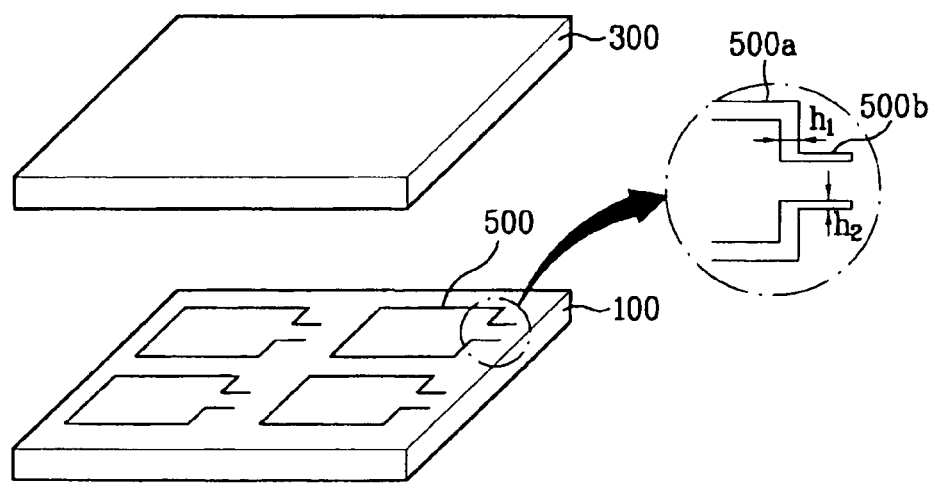

Referring to FIG. 3B, seal patterns 500 are then coated on the lower substrate 100. Although the present embodiment illustrates the seal patterns 500 coated on the lower substrate 100, it should be understood that the seal patterns 500 may be coated on the upper substrate 300. Also, although four seal patterns 500 are illustrated in FIG. 3B under the assumption that there are four unit cells, the number of the unit cells varies depending on the size of each unit cell and the sizes of the substrates 100 and 300, and consequently, the number of the seal patterns 500 also varies depending on the number of the unit cells.

Each of the seal patterns 500 includes a main pattern 500a and an injection port pattern 500b. Here, a width $h_2$ of the injection port pattern 500b is smaller than a width $h_1$ of the main pattern 500a. This configuration has the effect of minimizing an amount of a seal pattern spreading out to a neighboring unit cell during a following substrate bonding process and thus solve the problem of the cutting process of the related art.

The width $h_2$ of the injection port pattern 500b is beneficially in a range of about 0.125 mm to about 0.350 mm. In general, a width of seal patterns in an LCD device is approximately 0.7 mm. The width $h_2$ of the injection port pattern 500b is set to about 0.350 mm (half of the width of the typical seal patterns) or less to achieve a desired effect of the present invention. However, an excessively narrow width of the seal pattern may cause an opening in the seal pattern during a coating process. Accordingly, the width of $h_2$ of the injection port pattern 500b is more than about 0.125 mm.

Figure 4:
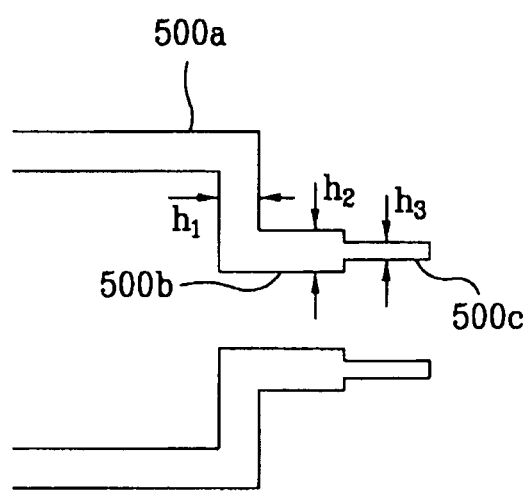
FIG. 4 is a schematic plan view illustrating an alternative example of a seal pattern included in the LCD device according to the first embodiment of the present invention.

Referring to FIG. 4, alternatively, each seal pattern 500 may include a main pattern 500a, a first injection port pattern 500b and a second injection port pattern 500c. Here, a width $h_3$ of the second injection port pattern 500c is smaller than the width $h_2$ of the first injection port pattern 500b, and in turn, the width $h_2$ of the first injection port pattern 500b is smaller than the width $h_1$ of the main pattern 500a. With this alternative configuration in which the widths of the plurality of injection port patterns gradually decrease as the patterns are further away from the main pattern, it is possible to reduce the possibility of an opening in the seal pattern during a coating process. The width $h_3$ of the second injection port pattern 500c, which is located at the farthest distance from the main pattern 500a, is beneficially in a range of about 0.125 mm to about 0.350 mm. At this point, it should be appreciated that each seal pattern 500 may further include a third injection port pattern having a width smaller than the width $h_3$ of the second injection port pattern 500c, and so on.

Figure 3C:
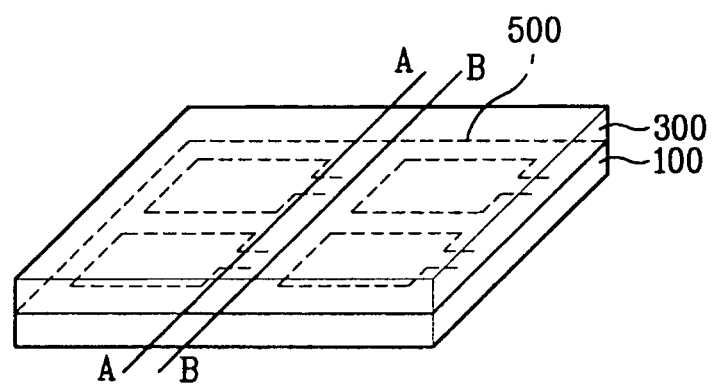

Referring to FIG. 3C, the lower substrate 100 and upper substrate 300 are then bonded to each other. This process is performed by applying a pressure to the lower and upper substrates 100 and 300 which come into contact with each other and curing the seal patterns 500. When a predetermined pressure is applied to the lower and upper substrates 100 and 300, the seal patterns 500 may spread out to a neighboring unit cell beyond a scribe line A. In FIG. 3C, the line A-A is a scribe line for cutting both the lower and upper substrates 100 and 300, and the line B-B is a scribe line for cutting only the upper substrate 300. The curing process of the seal patterns 500 is accomplished by a thermo-setting process or UV irradiation process depending on the type of the seal material used in the seal patterns 500.

Figure 3D:
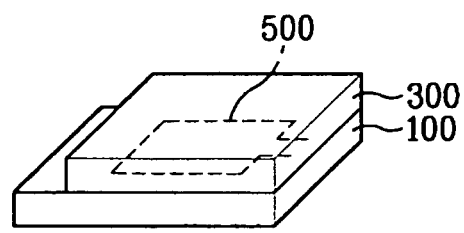

Referring to FIG. 3D, the bonded lower and upper substrates 100 and 300 are cut into individual unit cells. The cutting process includes a primary cutting process for cutting both the lower substrate 100 and upper substrate 300 along the line A-A of FIG. 3C and a secondary cutting process for cutting a portion of the upper substrate 300 along the line B-B of FIG. 3C.

As illustrated in FIG. 3B, because the width $h_2$ of the injection port pattern 500b is smaller than the width $h_1$ of the main pattern 500a, an amount of the injection port pattern 500b spreading out to a neighboring unit cell can be prevented or minimized and thus the cutting process of a portion of the upper substrate 300 along the line B-B can be efficiently formed.

Although not shown, liquid crystal is then injected into a space between the lower substrate 100 and the upper substrate 300 through the injection port pattern 500b of the seal pattern 500 formed in each unit cell after the cutting process. After completing the injection of liquid crystal, the injection port pattern 500b is sealed to complete the fabrication process of the LCD device.

An LCD device fabricated by the first embodiment of the present invention thus includes the lower substrate 100 and upper substrate 300 facing each other, and the seal pattern 500 formed between the lower and upper substrates 100 and 300. Although not shown, the seal pattern 500 contains liquid crystal formed therein.

The seal pattern 500 may include the main pattern 500a and the injection port pattern 500b as illustrated in FIG. 3B. Here, the width $h_2$ of the injection port pattern 500b is smaller than the width $h_1$ of the main pattern 500a. Beneficially, the width of the injection port pattern 500b is more than about 0.125 mm and less than about 0.350 mm.

The seal pattern 500 may alternatively include the main pattern 500a, the first injection port pattern 500b, and the second injection port pattern 500c as illustrated in FIG. 4. Here, the width $h_3$ of the second injection port pattern 500c is smaller than the width $h_2$ of the first injection port pattern 500b, and in turn, the width $h_2$ of the first injection port pattern 500b is smaller than the width $h_1$ of the main pattern 500a. Beneficially, the width $h_3$ of the second injection port pattern 500c is more than about 0.125 mm and less than about 0.350 mm.

Second Embodiment

FIGS. 5A to 5D are schematic perspective views illustrating a method for fabricating an LCD device according to the second embodiment of the present invention.

Figure 5A:
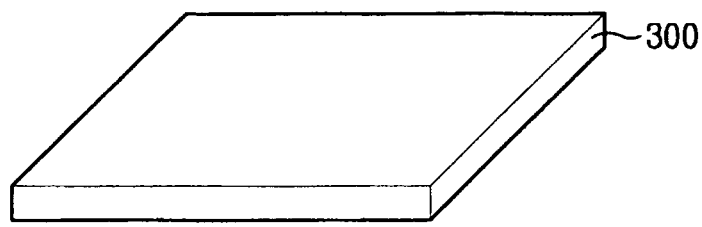
FIGS. 5A to 5D are schematic perspective views illustrating a method for fabricating an LCD device according to the second embodiment of the present invention.

Referring to FIG. 5A, a lower substrate 100 and an upper substrate 300 are first prepared. As the processes for forming the lower substrate 100 and upper substrate 300 are the same as those of the first embodiment, a detailed description thereof will be omitted.

Figure 5B:
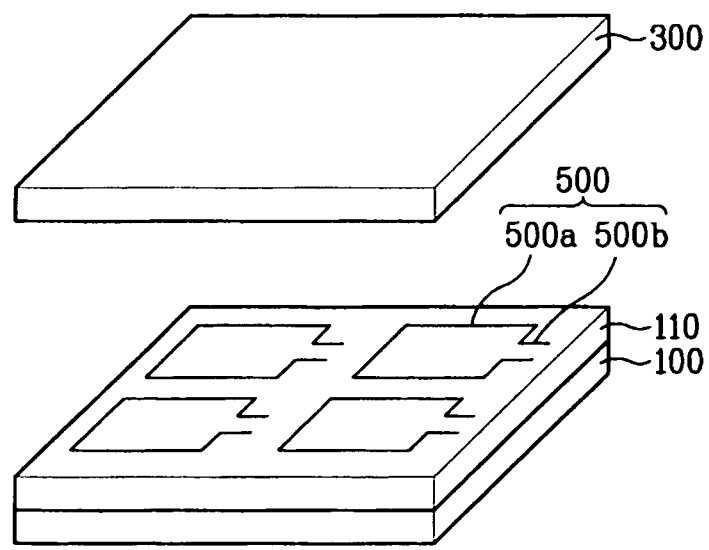

Referring to FIG. 5B, an organic layer 110 is then formed on the lower substrate 100 and seal patterns 500 are coated on the organic layer 110. Each of the seal patterns 500 includes a main pattern 500a and an injection port pattern 500b. Although the seal patterns 500 are coated on the lower substrate 100 in this embodiment, it should be understood that the seal patterns 500 may be coated on the upper substrate 300. Also, although four seal patterns 500 are illustrated in FIG. 5B under the assumption that there are four unit cells, the number of the unit cells varies depending on the size of each unit cell and the sizes of the substrates 100 and 300, and consequently, the number of the seal patterns 500 also varies depending on the number of the unit cells.

The organic layer 110 is beneficially made of a photo-acrylic material having a low adhesive force with the seal material. Accordingly, when the seal patterns 500 is formed on the organic layer 110, the adhesive force between the lower substrate 100 and the seal material becomes lower than the adhesive force between the upper substrate 300 and the seal material. As a result, even when the seal patterns 500 spread out to a neighboring unit cell during a substrate bonding process, a portion of the upper substrate 300 can be easily separated from the unit cell during a cutting process.

Figure 6A:
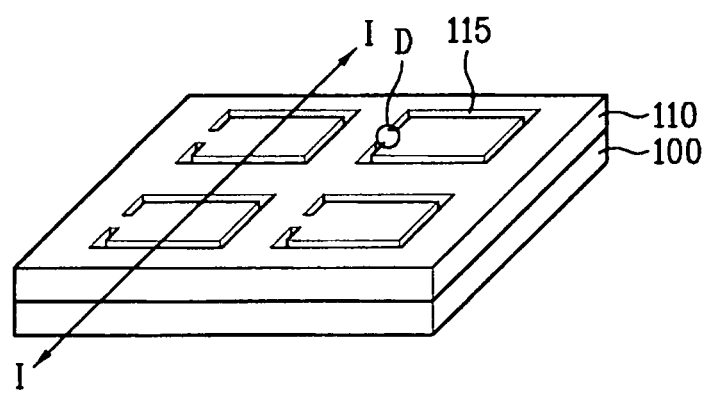
FIG. 6A is a schematic perspective view illustrating an alternative example of an organic film included in the LCD device according to the second embodiment of the present invention.
Figure 6B:
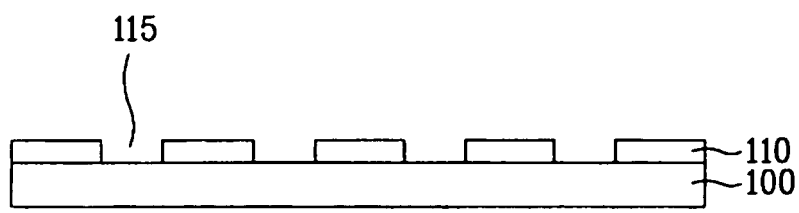
FIG. 6B is a cross-sectional view taken along the line I-I of FIG. 6A.

The organic layer 110 may be formed on the overall surface of the lower substrate 100, as illustrated in FIG. 5B. In this case, the organic layer 110 may, however, hinder an efficient cutting of the lower substrate 100. To solve this problem, as illustrated in FIGS. 6A and 6B, the organic layer 110 is formed on the lower substrate 100 with trenches 115 at regions of the cutting lines except for the region "D" of FIG. 6A at which the injection port pattern 500b spreads and moves during a substrate bonding process. These perforated trenches 115 minimize or prevent the organic layer 110 from hindering an efficient cutting process and the region "D" helps separate a portion of the upper substrate 300 from the unit cell during a cutting process.

The organic layer 110 may be replaced by a protective layer, which is formed below pixel electrodes during the fabrication of an LCD device, or may be additionally formed on the protective layer.

Figure 5C:
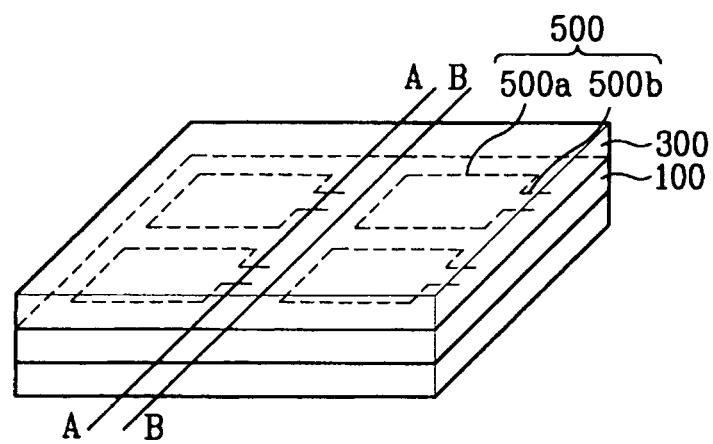

Referring to FIG. 5C, the lower substrate 100 and the upper substrate 300 are then bonded to each other. This process is performed by applying a pressure to the lower and upper substrates 100 and 300 which come into contact with each other and curing the seal patterns 500. As other details of the bonding process are the same as those of the first embodiment, a detailed description thereof will be omitted.

Figure 5D:
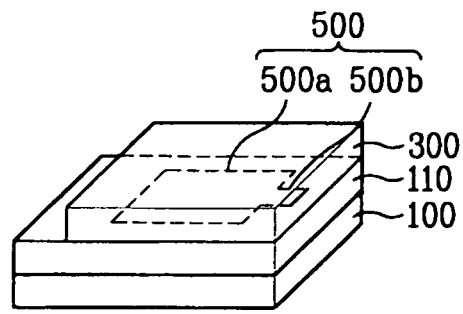

Referring to FIG. 5D, the bonded lower and upper substrates 100 and 300 are cut into individual unit cells. The cutting process includes a primary cutting process for cutting both the lower substrate 100 and upper substrate 300 along the line A-A of FIG. 5C and a secondary cutting process for cutting a portion of the upper substrate 300 along the line B-B of FIG. 5C in order to expose a pad portion of the lower substrate 100.

Because the seal patterns 500 are formed on the organic layer 110 as illustrated in FIG. 5B, the adhesive force between the lower substrate 100 and the seal patterns 500 becomes lower than the adhesive force between the upper substrate 300 and the seal patterns 500. Accordingly, even when the injection port pattern 500b spreads out to a neighboring unit cell as illustrated in FIG. 5C, the cutting process of a portion of the upper substrate 300 along the line B-B can be efficiently performed as illustrated in FIG. 5D.

Although not shown, liquid crystal is then injected into a space between the lower substrate 100 and the upper substrate 300 through the injection port pattern 500b of the seal pattern 500 formed in each unit cell after the cutting process. After completing the injection of liquid crystal, the injection port pattern 500b is sealed to complete the fabrication process of the LCD device.

An LCD device according to the second embodiment of the present invention thus includes the lower substrate 100 and upper substrate 300 facing each other, the organic layer 110 formed on the lower substrate 100, and the seal pattern 500 formed between the lower and upper substrates 100 and 300. Although not shown, the seal pattern 500 contains liquid crystal formed therein.

The seal pattern 500 may include the main pattern 500a and the injection port pattern 500b as illustrated in FIG. 5D. The organic layer 110 is beneficially made of a photo-acrylic material having a relatively low adhesive force with the seal material.

Although the organic layer 110 may be formed on the overall surface of the lower substrate 100 as illustrated in FIG. 5B prior to the cutting process, the organic layer 110 may beneficially be formed on the lower substrate 100 with the trenches 115 as illustrated FIGS. 6A and 6B.

Third Embodiment

An LCD device and method for fabricating the same according to the third embodiment of the present invention will now be explained.

A lower substrate 100 and an upper substrate 300 are first prepared. Then, an organic layer 110 is formed on the lower substrate 100 and seal patterns 500 are coated on the organic layer 110. The organic layer 110 is beneficially made of a photo-acrylic material having a low adhesive force with the seal material. Each of the seal patterns 500 includes an main pattern 500a and an injection port pattern 500b, as illustrated in FIG. 3B. A width $h_2$ of the injection port pattern 500b is smaller than a width $h_1$ of the main pattern 500a. The width $h_2$ of the injection port pattern 500b is beneficially in a range of about 0.125 mm to about 0.350 mm.

Alternatively, the seal pattern 500 may include the main pattern 500a, a first injection port pattern 500b and a second injection port pattern 500c, as illustrated in FIG. 4. Here, a width $h_3$ of the second injection port pattern 500c is smaller than a width $h_2$ of the first injection port pattern 500b, and the width $h_2$ of the first injection port pattern 500b is smaller than a width $h_1$ of the main pattern 500a. The width $h_3$ of the second injection port pattern 500c, which is located at the farthest distance from the main pattern 500a, is beneficially in a range of about 0.125 mm to about 0.350 mm.

Although the organic layer 110 may be formed on the overall surface of the lower substrate 100 as shown in FIG. 5B, the organic layer 100 is beneficially formed on the lower substrate 100 with trenches 115 at regions of cutting lines except for the region "D" of FIG. 6A at which the injection port pattern 500b spreads and moves during a substrate bonding process, as illustrated in FIGS. 6A and 6B.

Then, the lower substrate 100 and upper substrate 300 are bonded to each other. Thereafter, the bonded lower and upper substrates 100 and 300 are cut into individual unit cells.

Liquid crystal is then injected into a space between the lower substrate 100 and the upper substrate 300 through the injection port pattern 500b formed at each unit cell after the cutting process. After completing the injection of liquid crystal, the injection port pattern 500b is sealed to complete the fabrication process of the LCD device.

An LCD device according to the third embodiment of the present invention thus includes the lower and upper substrates 100 facing each other, the organic layer 110 formed on the lower substrate 100, and the seal pattern 500 formed between both the substrates 100 and 300. Although not shown, the seal pattern 500 contains liquid crystal formed therein.

As the configurations of the seal pattern 500 and organic layer 110 are the same as or similar to those of first and second embodiments, a detailed description thereof will be omitted.

According to the present invention, an injection port pattern, which may spread out to a neighboring unit cell during a substrate bonding process, has a smaller width that that of a main pattern. As a result, an amount of a seal pattern spreading out to a neighboring unit cell during a following substrate bonding process can be minimized and the cutting process can be improved.

In addition, according to the present invention, an organic layer is formed on the lower substrate. As a result, even when the injection port pattern spread out to a neighboring unit cell during a substrate bonding process, a portion of the upper substrate can be efficiently and easily separated from the unit cell during a cutting process.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display device comprising:

preparing a lower substrate and an upper substrate;

forming a plurality of seal patterns on any one of the upper and lower substrates, each seal pattern of the plurality of seal patterns including a main pattern and an injection port pattern, wherein the injection port pattern is at an end of the main pattern at an opening in the main pattern and includes first and second seal pattern portions, both first and second seal patterns including a long side and a short side, protruded perpendicular from the main pattern with the first seal pattern portion extending continuously from the end of the main pattern on either side of the opening, wherein a width of the first seal pattern portion is uniform and smaller than a width of the main pattern and a width across the short side of the second seal pattern portion, extending continuously from the end of the first seal pattern portion, is smaller than a width of the short side of the first seal pattern portion to allow separation of a portion of the upper substrate from the upper substrate during a cutting process;

bonding the upper and lower substrates to each other using the plurality of seal patterns; and cutting the bonded upper and lower substrates into a plurality of unit cells, wherein the portion of the upper substrate is cut to expose a pad portion of the lower substrate.

2. The method according to claim 1, wherein a width of a portion of the protruded injection port pattern is in a range of about 0.125 mm to about 0.350 mm.

3. The method according to claim 1, further comprising:

injecting a liquid crystal into one of the unit cells through the injection port pattern; and sealing the injection port pattern.

* * * * *